C. E. KRAUS AND T. C. BARRETT.
AUTOMOBILE BUMPER.
APPLICATION FILED NOV. 6, 1920.
1,365,593.
Patented Jan. 11, 1921.
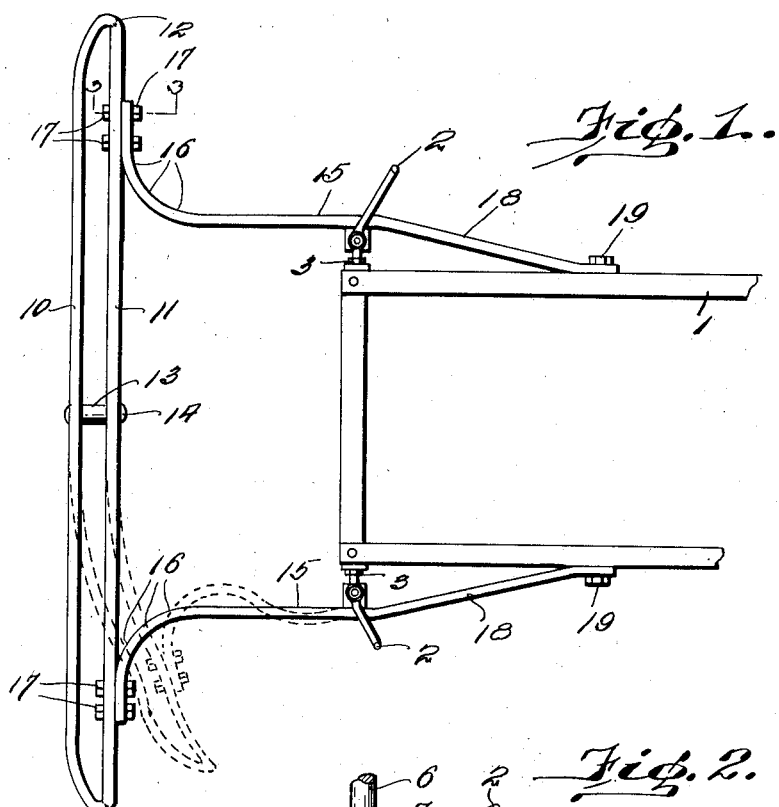
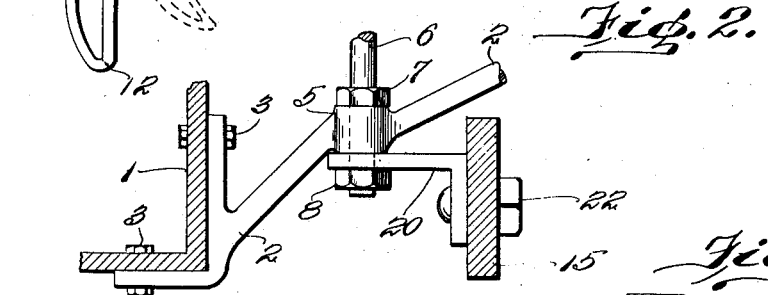
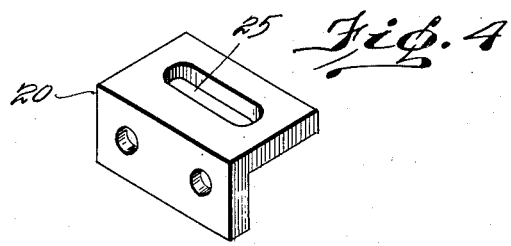
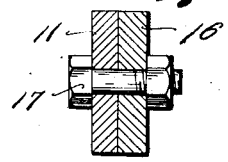
INVENTOR.
Charles E. Kraus &
BY Thomas C. Barrett
Eugene C. Brown
ATTORNEY.
Witness

UNITED STATES PATENT OFFICE.

CHARLES E. KRAUS AND THOMAS C. BARRETT, OF LOUISVILLE, KENTUCKY.

AUTOMOBILE-BUMPER.

1,365,593.

Specification of Letters Patent. Patented Jan. 11, 1921.

Application filed November 6, 1920. Serial No. 422,171.

*To all whom it may concern:*

Be it known that we, CHARLES E. KRAUS and THOMAS C. BARRETT, both citizens of the United States, residing at Louisville, in the county of Jefferson and State of Kentucky, have invented certain new and useful Improvements in Automobile-Bumpers, of which the following is a specification.

This invention relates to bumpers for automobiles and while designed particularly for use with vehicles of the Ford type, it may be adapted for use with automobiles of any style.

The main object of our invention is to provide an automobile bumper which will yield and bend under impact and the parts being so coördinated that it will yield as a whole in neutralizing a blow without danger of breaking any of the parts.

A further object of our invention is to provide a supporting arrangement for the bumper consisting of a two-point suspension whereby longitudinal and other stresses to which the supports are subjected will be distributed over a greater portion of the vehicle frame and not localized at any one point.

The invention is illustrated in the accompanying drawings in which Figure 1 is a top plan view of our bumper illustrating the manner in which it is attached to the chassis of the vehicle;

Fig. 2 is a detail partly in elevation and partly in section, illustrating the manner in which the side brackets are connected with the forward end of the chassis;

Fig. 3 is a section on the line 3—3 of Fig. 1 illustrating the connector of the bumper with the side supporting bars; and Fig. 4 is a perspective view of the angle piece which connects the bumper side-bars with the lamp bracket.

In the drawings 1 designates the chassis of a motor vehicle of any ordinary construction, the present invention being particularly applicable to Ford cars. The side frame members are provided with the usual fender braces 2, which are secured by bolt and nut fastenings 3, and to the fender in the usual manner. Adjacent its connection with the chassis side member, the fender brace is provided with a vertically apertured enlargement 5 to accommodate the bracket arm 6 of the automobile head lamp, (not shown) said arms being secured in position by means of nuts 7 and 8.

The bumper embodies front and rear steel strips 10 and 11, the ends of the front strip 10 being turned inwardly and welded at 12 to the ends of the strip 11. The bumper members are maintained in spaced relation and braced by a short sleeve 13 inclosing and secured by a bolt 14.

The bumper is carried by side bars 15 of flexible steel, the forward ends of which are curved outwardly at 16, and are secured to the rear strip 11 by bolts and nuts 17. The rear ends of the side bars 18 are bent inwardly toward the side frames of the chassis and secured by bolts 19. The side bars 15 are secured to the forward end of the chassis by angle brackets 20 fastened to the bars by bolts 22. The horizontal portion of the bracket is provided with a slot 25 to fit over the lower end of the lamp bracket 6, the slot being elongated to provide for accurate adjustment.

By bolting the side bars to the chassis both at the rear ends and at an intermediate point, a double support is provided thus affording a much more substantial construction and one in which the shock, due to contact of the bumper with an object, are much more easily met without undue strain or stress exerted upon the chassis or the side bars.

We construct the bumper including the side bars and brackets of non-spring flexible steel, such as steel having a low carbon content, so that it will bend under impact but will not break, even when subjected to a sudden severe blow. In so far as we are aware it has been the universal practice to construct automobile buffers of spring steel so that they might yield somewhat under impact and then return to normal position, the resiliency of the tempered steel being relied upon to absorb the force of the blow. While the resiliency of spring steel is sufficient to absorb light shocks, we have found that it is too rigid to completely cushion heavy impacts if the steel spring is large enough in section to resist the blow without exceeding its elastic limit. Furthermore, a bumper constructed of spring steel is very liable to break under sudden or undue strain.

We have overcome the defects in prior buffers above mentioned by employing nonspring steel which is flexible and yet will bend under impact. We connect the parts rigidly together so that the bumper has no loose parts and acts as a unitary structure in absorbing the force of a blow. Under an unusually severe shock the angle brackets may also yield and bend to assist in cushioning the blow.

We have particularly designed the several parts of the bumper so that each part may coöperate with the others in neutralizing and absorbing the force of impact as they yield and bend. As indicated in dotted lines in Fig. 1, the curve at 16 in the side arms permits these members to instantly bend and remain bent or set, thereby absorbing the force of a blow in the flexure of the metal without reaction or offering a rigid resistance as would occur if the arms were straight.

The buffer member carried by the side arms is especially designed to absorb the force of a blow by the internal stresses set up by the flexure of the two parts. It will be observed that the front portion 10 is curved rearwardly adjacent the ends, thus forming a bow or arched member the ends of which are connected by the straight rear chord member 11. The intermediate portion of the bow member is stiffened by the spacer sleeve 13, acting as a strut to prevent the entire collapse of the arch. When, therefore, an obstacle is encountered tending to bend the bumper rearwardly, the front bow member is placed under tension and the rear chord member is placed under compression, as will be evident to engineers. Internal molecular strains are thus set up in the metal which tend to absorb the force of the impact and by reason of the integral structure of the bumper, the strains are distributed.

The advantages which our construction possesses over prior automobile shock absorbing devices will now be appreciated by engineers and those familiar with devices of this character. We have described in detail the particular construction illustrated in the drawings but it will be evident that various changes and modifications may be made without departing in any manner from our invention.

We claim:—

1. An automobile bumper, comprising a flexible buffer member, flexible supporting bars rigidly secured to said buffer adjacent its ends and provided with means for attachment to the chassis of an automobile, said buffer and supporting bars being constructed of non-spring iron or steel which maintains a permanent set when bent, whereby the force of an impact is absorbed by the bending of the metal with substantially no reaction.

2. An automobile bumper, comprising flexible front and rear buffer members spaced apart, secured together at their ends and provided with an intermediate brace, supporting bars rigidly secured to said rear member adjacent the ends thereof and provided with fastening means at their rear ends, and intermediate fastening means comprising angle brackets rigidly secured to said supporting bars and having their projecting flanges extending parallel with the longitudinal axis of the bars and positioned intermediate the lateral edges thereof, said flanges being slotted to receive the lamp standard of an automobile.

3. An automobile bumper, comprising a flexible buffer member, side supporting bars secured thereto adjacent the ends thereof and provided with fastening means at their rear ends, and an intermediate supporting brace comprising angle brackets riveted thereto and having the projecting flange positioned intermediate the lateral edges of the bars, said flanges having elongated slots to permit adjustment upon a vertically extending stem depending from the chassis of an automobile.

In testimony whereof we affix our signatures.

CHARLES E. KRAUS.
THOMAS C. BARRETT.